United States Patent [19]

Johnston et al.

[11] Patent Number: 4,667,788

[45] Date of Patent: May 26, 1987

[54] THURST TYPE ONE-WAY ROLLER CLUTCH

[75] Inventors: Albert D. Johnston, Huron; Joseph L. Tengowski, Norwalk; Ernest G. Steele, Vermilion; Edward W. Molloy, Port Clinton, all of Ohio

[73] Assignee: General Motors Corporation, Detroit, Mich.

[21] Appl. No.: 751,874

[22] Filed: Jul. 5, 1985

[51] Int. Cl.⁴ ............................................. F16D 41/07
[52] U.S. Cl. ..................................................... 192/45
[58] Field of Search ................. 192/45, 44; 188/82.84

[56] References Cited

U.S. PATENT DOCUMENTS

| | | | |
|---|---|---|---|
| 185,696 | 12/1876 | Peppard | 192/45 |
| 524,530 | 8/1894 | Porter | 192/45 |
| 1,992,527 | 2/1935 | Garratt | 192/41 R |
| 2,259,473 | 10/1941 | Johnson | 192/44 |
| 3,557,921 | 1/1971 | Takada | 192/45 |
| 3,651,908 | 3/1972 | Oldfield | 192/45.1 |
| 3,997,041 | 12/1976 | Judd et al. | 192/45.1 X |
| 4,462,490 | 7/1984 | Hattori | 192/45 X |

Primary Examiner—Rodney H. Bonck
Assistant Examiner—David A. Testardi
Attorney, Agent, or Firm—Patrick M. Griffin

[57] ABSTRACT

A thrust type one-way roller clutch includes a means to assure that the centrifugal force of rotation does not destabilize the ready position of the rollers. The cam ramp surfaces are angularly offset from a radial line in a direction opposite to the allowed direction of relative race rotation. The energizing springs bias the rollers toward a ready position of light engagement with the cam ramp surfaces, thus maintaining the rollers with their individual axes similarly angularly offset. As a consequence, the centrifugal force of rotation will cause the rollers to move in a direction toward ready position only.

3 Claims, 5 Drawing Figures

THURST TYPE ONE-WAY ROLLER CLUTCH

This invention relates to roller clutches generally and specifically to a thrust type one-way roller clutch that includes means to allow it to operate without adverse effect on the rollers from the centrifugal force of rotation.

BACKGROUND OF THE INVENTION

It is well known to use roller bearings in either radial or thrust applications. In radial applications, the rollers are arranged between cylindrical, radially spaced races with the individual roller axes parallel to the axis of the races. In thrust applications, the rollers are arranged between generally flat, axially spaced races with the individual roller axes disposed on radial lines normal to the axis of the races, like spokes of a wheel. Both applications are frequently found. Likewise, in the case of one-way clutches that use rollers, both radial and thrust applications with similarly arranged rollers are known. In the case of roller clutches, however, thrust applications are relatively rare.

An example of a thrust type roller clutch with rollers arranged between generally flat races and the individual roller axes disposed on radial lines normal to the axis of the races may be found in the Johnson U.S. Pat. No. 2,259,473, in FIGS. 20–28. There, the rollers are tapered rollers 95 arranged between races 91 and 92. Just as with a radial one-way clutch, the inside surface of one race 92 further includes a plurality of cam ramp surfaces 94 respective to the rollers 95. The rollers 95 wedge between the cam ramp surfaces 94 and the other race 91 to allow relative race rotation in one direction only. In fact, the embodiment disclosed there is bi-directional, meaning that the ramp surfaces 94 are two sided, or generally V-shaped. Two sets of energizing springs 105 bias either side of the rollers 95 toward either side of the V-shaped cam ramp surfaces 94, depending on which direction a control ring 100 to which the springs 105 are mounted is shifted. Thus, allowed relative race rotation in either direction can be selected, but in each mode, the clutch operates as would a conventional one-way clutch with one cam sided ramp surfaces.

One problem to which the above patent does not speak is the effect of centrifugal force on the rollers. In order to operate quickly and efficiently, the energizing springs in a one-way roller clutch should maintain the individual rollers in a ready position in which the side of each roller is lightly engaged with, or at least proximate to and parallel to, its respective cam ramp surface. This assures that each roller will be ready to quickly wedge between its cam ramp surface and the other race to prevent relative race rotation when the races attempt to reverse their relative direction. The effect of the centrifugal force of rotation of the race that carries the cam ramp surfaces and the rollers has the potential to cause the rollers to move out of ready position. The effect of centrifugal force is a potential problem for both radial and thrust type one-way roller clutches, limiting the speeds at which they may operate. In the case of conventional radial one-way roller clutches, the problem is known as roller drift. This refers to the tendency of the centrifugal force of rotation of the radially outer race to throw the rollers radially outwardly, which compresses the energizing spring and moves the roller up the cam ramp surface and out of ready position. The copending U.S. patent application Ser. No. 521,676, which has the same inventor and assignee as the present invention, solves that problem in its own unique way for a radial one-way roller clutch.

In the case of a thrust type one-way roller clutch, a similar problem is presented. The rollers, in the known arrangement, are disposed with their individual axes lying on radial lines normal to the axis of the races, and are biased by energizing springs toward the cam ramp surfaces. The centrifugal force of rotation of the race with the cam ramp surfaces, which also carries the rollers, will cause the rollers to clockwise or counterclockwise direction, one of which move either away from their respective cam ramp surfaces, out of ready position, or toward their cam ramp surfaces, since the rollers will, in reality, never lie exactly on radial lines. The ready position of the rollers will not be stable with that roller arrangement.

SUMMARY OF THE INVENTION

The subject invention provides a thrust type one-way roller clutch that solves the problem discussed above.

The clutch of the invention includes a pair of coaxial, axially confronting races, one of which is rotatable relative to the other in one direction. One of the races, the cam race, includes a plurality of planar cam ramp surfaces that are generally radially directed, but which are angularly offset relative to a radial line of the cam race. The direction of angular offset is opposite to the direction of allowed relative rotation of the cam race. A plurality of axial rollers, cylindrical rollers in the embodiment disclosed, are located between the races, one located between each cam ramp surface and the other race. The rollers are caged to contain them between the races.

The clutch of the invention also includes a means to maintain the rollers with their axes angularly offset in the same direction as the cam ramp surfaces relative to a radial line of the cam race. In the embodiment disclosed, that means is conveniently provided by roller energizing springs which bias each roller toward a ready position of light engagement with its respective cam ramp surface. Because of the angular offset of the cam ramp surfaces, the energizing springs and cam ramp surfaces also cooperate to maintain the rollers with their axes angularly offset similarly. Consequently, the centrifugal force of rotation of the cam race will tend to cause the rollers to only move toward their respective cam ramp surfaces, and the ready position will be stable.

It is, therefore, an object of the invention to provide a thrust type one-way roller clutch including a pair of coaxial, axially confronting races, one of which is rotatable relative to the other in one direction and includes at least one generally radially directed cam ramp surface that is angularly offset relative to a radial line of the race in the opposite direction, an axial roller located between the cam ramp surface and the other race, and means to maintain the roller with its axis angularly offset relative to a radial line of the race in the same direction as the cam ramp surface, so that the centrifugal force of rotation will cause the roller to move toward its respective cam ramp surface and keep it in the proper ready position to be wedged between the cam ramp surface and the other race to prevent the races from rotating relatively in the opposite direction.

It is another object of the invention to provide a thrust type one-way roller clutch of the type described in which the means to maintain the roller with its axis offset is a resilient means which biases the roller toward a ready position of light engagement with the cam ramp surface, thereby cooperating with the offset cam ramp surface to maintain the roller with its axis angularly offset similarly to the cam ramp surface.

It is yet another object of the invention to provide a thrust type one-way roller of the type described including a plurality of cam ramp surfaces on one race and a plurality of rollers respective thereto and contained between the races by a cage, with a plurality of energizing springs joined to said cage and acting to bias each of said rollers toward a ready position of light engagement with its respective cam ramp surface, thereby maintaining the rollers with their axes angularly offset similarly to the respective cam ramp surfaces.

DESCRIPTION OF THE PREFERRED EMBODIMENT

These and other objects and features of the subject invention will appear from the following written description and drawings in which.

Figure 1:
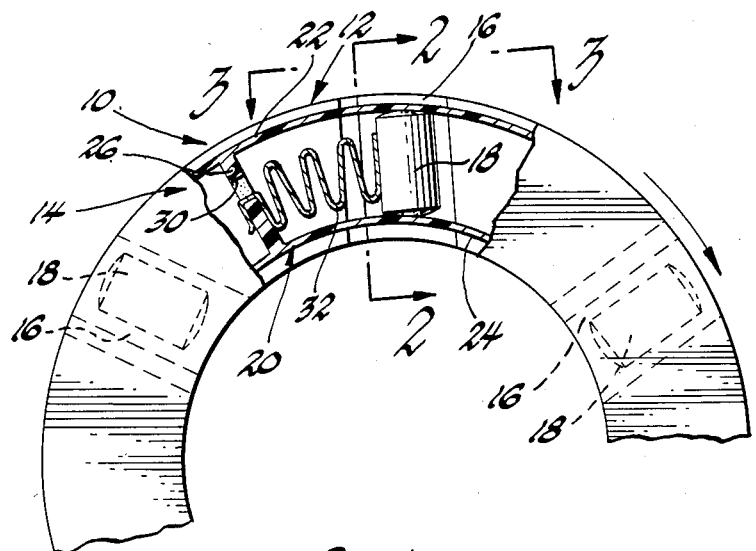
FIG. 1 is a plan view showing approximately one half of the races of the subject invention with a section of one race broken away to reveal other structure.
Figure 2:
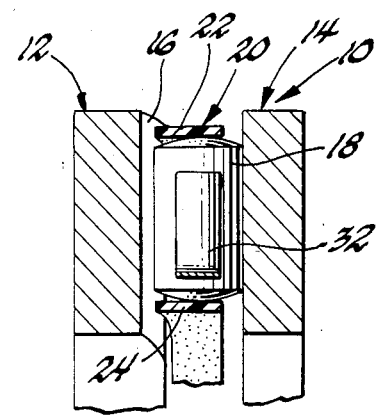
FIG. 2 is a sectional view taken along the line 2—2 of FIG. 1.
Figure 3:
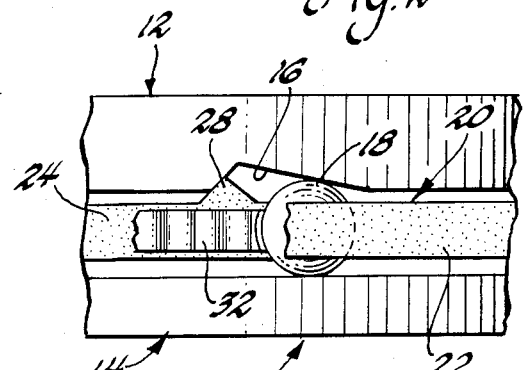
FIG. 3 is a view taken along the line 3—3 of FIG. 1 looking in the direction of the line Ro of FIG. 4.

Referring first to FIGS. 1 through 3, the preferred embodiment of the invention is designated generally at 10. The embodiment 10 is a thrust type one-way roller clutch, the general features of which have been fully described above. As with any one-way clutch, it would be used between two coaxial members to allow overrunning in one relative direction of rotation, but lock up in the other relative direction. The embodiment 10 includes a pair of coaxial, axially confronting races, designated generally at 12 and 14. Each of these races would be structurally tied to one of the members referred to above, an example of which will be discussed below. The race 12, called the cam race, includes a plurality of generally planar, generally radially directed sloped cam ramp surfaces 16 cut thereinto and spaced circumferentially evenly therearound. Cam race 12 is rotatable relative to race 14 in just the clockwise direction, as viewed in FIG. 1. Consequently, those members to which races 12 and 14 are tied would relatively rotate in just the clockwise direction.

The one-way rotation results from the cooperation of cam ramp surfaces 16 with a plurality of axial rollers, which are cylindrical rollers 18 in the embodiment disclosed. One roller 18 is located between each cam ramp surface 16 and the other race 14. More detail on the operation of rollers 18 will be given below. Basically, however, rollers 18 will wedge between cam ramp surfaces 16 and the other race 14 should cam race 12 attempt to rotate relative to the other race 14 in the counter-clockwise direction. This one-way action is analogous to that of a radial clutch. The invention is broad enough to encompass situations where both races 12 and 14 rotate relative to ground, as well as situations where the race 14 rotates not at all, or only slowly, relative to ground. In any situation where the cam race 12 rotates it will create a centrifugal force on the rollers 18.

The problem of centrifugal force and consequent unstable roller ready position has already been discussed above. The invention's solution to that problem may be understood by referring to FIGS. 2-4. It will be noted that while cam ramp surfaces 16 are generally radially directed, they do not lie directly on the radial line R in FIG. 4, but are angularly offset in the counter-clockwise direction. Stated generally, cam ramp surfaces 16 are angularly offset relative to the radial line R in the direction opposite to the direction of allowed relative race rotation. Cam ramp surfaces 16 lie on the line Ro of FIG. 4, and the amount of angular offset from R is there clearly illustrated by the angle between the Lines R and Ro, being approximately 5-10 degrees.

The invention includes a means to maintain each roller 18 with its own axis also angularly offset in the same direction as the cam ramp surfaces 16. The amount of that offset need not be great. However, by virtue of being so offset, the centrifugal force of rotation that could otherwise tend to cause the rollers 18 to move in either direction will cause them instead to move only toward their respective cam ramp surfaces 16, counter-clockwise for the case illustrated. Therefore, the rollers 18 will have a stable ready position, remaining properly positioned so as to quickly wedge between their respective cam ramp surfaces 16 and the other race 14. Cam race 12 and any member to which it may be structurally tied may therefore operate at high speeds of rotation without being adversely affected by the centrifugal force of rotation.

Figure 4:
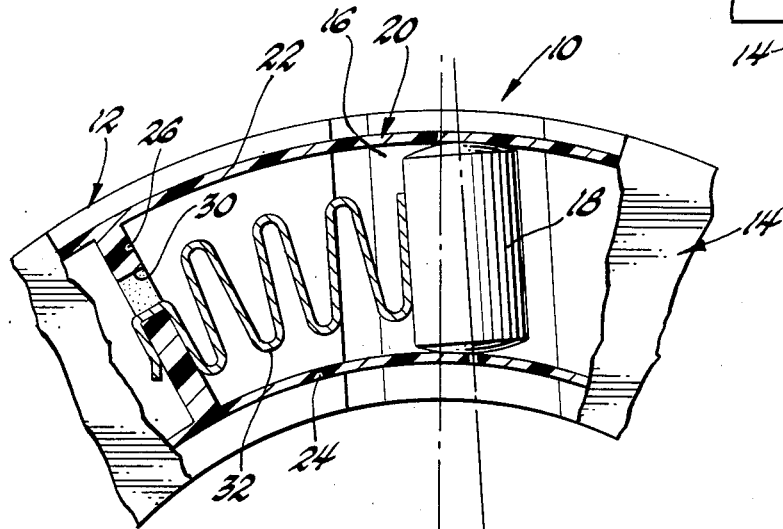
FIG. 4 is an enlarged view of a portion of FIG. 1.

The particular means used to maintain the rollers 18 with their axes angularly offset in the preferred embodiment 10 may be understood by referring to the FIGS. 2-4. A roller cage designated generally at 20 may be molded of nylon or otherwise formed of any suitable material. Cage 20 includes radially outer and radially inner circular side rails 22 and 24 respectively, interconnected by cross bars 26. Molded integrally with side rail 24 are a plurality of reaction ears 28 that interfit with cam ramp surfaces 16 to tie roller cage 20 to cam race 12 so that it will rotate therewith. Rollers 18 are located between side rails 22 and 24, and are thereby contained between races 12 and 14. Cross bars 26 are molded with a plurality of slots 30, each of which has an energizing spring 32 clipped thereto. Energizing springs 32 provide a continual bias of rollers 18 toward their respective cam ramp surfaces 16 to maintain rollers 18 lightly engaged with cam ramp surfaces 16. This continual bias maintains rollers 18 in the proper ready position to be quickly wedged between cam ramp surfaces 16 and the other race 14 when cam race 12 attempts to rotate relative to race 14 in the counter-clockwise direction. The ready position may be best seen in FIG. 3, which looks along the line Ro. Furthermore, since the cam ramp surfaces 16 are angularly radially offset from the radial line R as described, the energizing springs 32 also cooperate with the cam ramp surfaces to maintain the rollers with their individual axes similarly angularly offset. The energizing springs 32 thus serve two functions, both creating and stabilizing the ready position of the rollers.

Figure 5:
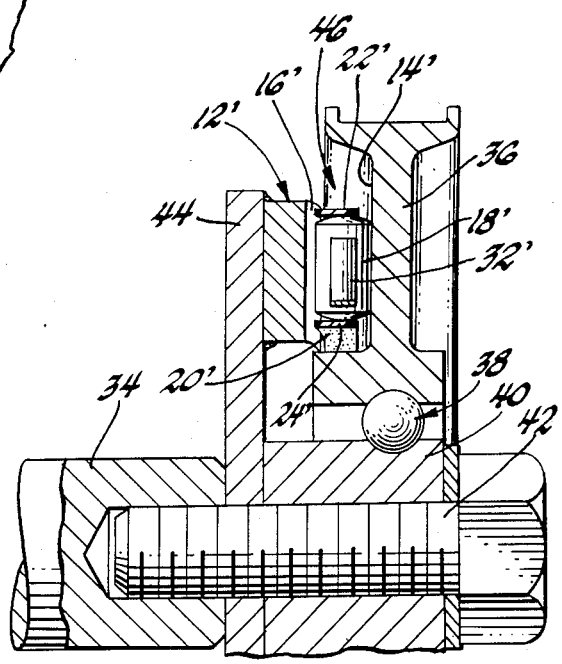
FIG. 5 is a view of an application of the invention as a torque compensator between a vehicle engine crankshaft and drive pulley, shown mostly in cross section.

The clutch of the invention could be particularly advantageous in a location where axial space between two coaxial members was limited. Axial rollers generally have a diameter smaller than their length, so the thrust type of roller clutch can potentially be made to occupy less axial space than a conventional radial roller clutch. One such possible use in a location where axial space is limited would be as a torsional compensator between an engine crankshaft and accessory drive pulley of a vehicle. Referring to FIG. 5, an engine crankshaft is shown at 34. An accessory drive pulley 36 is mounted coaxially to crankshaft 34 not directly, but through a ball bearing designated generally at 38. Ball bearing 38 maintains pulley 36 in axial and radial position relative to crankshaft 34. The elongated inner race 40 of bearing 38 is clamped by threaded bolt 42 to the end of crankshaft 34, also thereby clamping a radial plate 44 to crankshaft 34.

The clutch of the invention is shown in a different embodiment, designated generally at 46, but similar parts are given the same number with a prime. Cam race 12' is welded to radial plate 44, and thus fixed to crankshaft 34. The web of pulley 36, which is flat, serves as the other race 14'. Thus, the races 12' and 14' are maintained in axial and radial position relative to each other. The cam ramp surfaces 16' are angularly offset just as the the cam ramp surfaces 16 of embodiment 10 are, and the rollers 18' are maintained in the same position as the rollers 18. The crankshaft 34 and pulley 36 will generally rotate at the same speed, with clutch 46 locked up. Pulley 36 will then power whatever accessories it is connected with through a drive belt, not shown. But there may be variations in the engine speed that would tend to cause the crankshaft 34 to rotate at a slower speed relative to the pulley 36. The pulley 36 would tend to be carried at its current speed by the inertia of the accessories. The clutch 46 would then overrun, allowing the pulley 36 to overrun the crankshaft 34. The centrifugal force of rotation, which could be great for high engine speeds, will not affect the operation of clutch 46, for the reasons discussed above.

Variations of the preferred embodiment may be made within the confines of the invention. Other means may be used to maintain the rollers with their individual axes angularly offset. Other roller shapes, and other means of containing the rollers between the races, such as snap rings, may be used. Therefore, it will be understood that the invention is capable of being embodied in structures other than that disclosed, and is not intended to be so limited.

The embodiments of the invention in which an exclusive property or privilege is claimed are defined as follows:

1. A thrust type one-way roller clutch, comprising;
a pair of coaxial, axially confronting races, one of which is rotatable relative to the other in one direction, said one race further including a generally radially directed cam ramp surface that is angularly offset relative to a radial line of said one race in a direction opposite to said one direction of relative race rotation,
an axial roller located between said races and respective to said cam ramp surface, and
means maintaining said roller with its axis angularly offset relative to a radial line of said one race in said opposite direction, whereby, as said one race rotates, the centrifugal force of rotation will cause said roller to move toward said cam ramp surface so as to be in proper position to be wedged between said cam ramp surface and said other race to prevent said one race from rotating relative to said other race in said opposite direction.

2. A thrust type one-way roller clutch, comprising,
a pair of coaxial, axially confronting races, one of which is rotatable relative to the other in one direction, said one race further including a generally radially directed cam ramp surface that is angularly offset relative to a radial line of said one race in a direction opposite to said one direction of relative race rotation,
a cylindrical roller located between said races and respective to said cam ramp surface, and
resilient means biasing said roller toward its respective cam ramp surface to a ready position lightly engaged with said cam ramp surface so that said roller may wedge between said cam ramp surface and said other race to prevent said one race from rotating relative to said other race in said opposite direction, said resilient means, by biasing said roller toward said angularly offset cam ramp surface, also cooperating with said cam ramp surface to maintain the axis of said roller angularly offset similarly to said cam ramp surface, whereby, as said one race rotates, the centrifugal force of rotation will cause said roller to move toward said cam ramp surface so as to remain in ready position.

3. A thrust type one-way roller clutch, comprising;
a pair of coaxial, axially confronting races, one of which rotatable relative to the other in one direction, said one race further including a plurality of generally radially directed cam ramp surfaces that are angularly offset relative to a radial line of said one race in a direction opposite to said one direction of relative race rotation,
a plurality of cylindrical rollers located between said races, one respective to each said cam ramp surface,
a roller cage containing said rollers between said races, and,
a plurality of energizing springs joined to said cage, one biasing each of said rollers toward its respective cam ramp surface to a ready position lightly engaged with its cam ramp surfaces so that said rollers may wedge between said cam ramp surfaces and said other race to prevent said one race from rotating relative to said other race in said opposite direction, said energizing springs, by biasing said roller toward said angularly offset cam ramp surfaces, also cooperating with said cam ramp surfaces to maintain the axes of said rollers angularly offset similarly to said cam ramp surfaces, whereby, as said one race rotates, the centrifugal force of rotation will cause said rollers to move toward said cam ramp surfaces as to remain in ready position.

* * * * *